United States Patent
Liu

(10) Patent No.: US 6,470,053 B1
(45) Date of Patent: Oct. 22, 2002

(54) METHODS AND ARRANGEMENTS FOR TRANSMITTING DATA OVER TWISTED PAIR WIRE USING RF MODULATION TECHNIQUES

(75) Inventor: Ce Richard Liu, Sugarland, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/182,926

(22) Filed: Oct. 30, 1998

(51) Int. Cl.$^7$ .................................................. H04B 3/50
(52) U.S. Cl. ........................ 375/257; 375/219; 375/222; 375/295; 375/308; 375/316; 375/329; 375/356; 370/445; 370/463
(58) Field of Search .............................. 375/219, 222, 375/257, 361, 356, 279, 280, 295, 298, 308, 316, 329; 370/446, 448, 445, 463

(56) References Cited

U.S. PATENT DOCUMENTS

| | | | |
|---|---|---|---|
| 4,466,107 A | * 8/1984 | Stoner | 375/37 |
| 4,606,051 A | 8/1986 | Crabtree et al. | 375/86 |
| 5,119,398 A | * 6/1992 | Webber, Jr. | 375/7 |
| 5,347,225 A | 9/1994 | Graham | 324/523 |
| 5,365,515 A | 11/1994 | Graham | 370/17 |
| 5,379,005 A | 1/1995 | Aden et al. | 333/24 |
| 5,422,919 A | 6/1995 | Graham | 375/200 |
| 5,450,594 A | 9/1995 | Aden et al. | 395/200.06 |
| 5,467,061 A | 11/1995 | Aden et al. | 333/24 R |
| 5,550,506 A | 8/1996 | Tsumura | 329/304 |
| 5,587,692 A | 12/1996 | Graham et al. | 333/12 |
| 5,696,790 A | 12/1997 | Graham et al. | 375/238 |
| 5,929,896 A | * 7/1999 | Goodman et al. | 348/14 |
| 5,940,387 A | * 8/1999 | Humpleman | 370/352 |

OTHER PUBLICATIONS

Texas Instruments; "Implementing aΠ/4 Shift D–QPSK Baseband Modem Using the TMS320C50"; Sep. 1996; pp. 1–40.
3Com Corp. website, Robyn Aber; "xDSL Supercharges Copper"; Mar. 1997; pp. 1–5.
Tut Systems website; "Simply delivering xDSL . . . connecting the local loop to the campus, the high rise and throughout the home."; website update Nov. 3, 1997; pp. 1–6.
Zona Research, Inc.; "Compaq Hits Homerun with Tut"; Aug. 11, 1998; pp. 1–2.

* cited by examiner

Primary Examiner—Chi Pham
Assistant Examiner—Khanh Cong Tran
(74) Attorney, Agent, or Firm—Conley, Rose & Tayon, P.C.

(57) ABSTRACT

Methods and arrangements are provided for allowing various devices to communicate data over standard twisted pair wire within a confined region, such as a home environment. The methods and arrangements employ radio frequency (RF) communication techniques to modulate and transmit data signals over existing twisted pair phone lines at RF frequencies. The RF transmitted data can be detected over limited distances by other similarly configured devices. The RF transmitted data is then received and demodulated to regenerate the original data. The methods and arrangements also allow the data transmission to be conducted in accordance with conventional CSMA/CD techniques/protocols. Thus, for example, Ethernet network configured devices can be seamlessly interconnected using the methods and arrangements of the present invention without requiring that additional and/or upgraded wiring be installed in the home environment.

10 Claims, 3 Drawing Sheets

METHODS AND ARRANGEMENTS FOR TRANSMITTING DATA OVER TWISTED PAIR WIRE USING RF MODULATION TECHNIQUES

FIELD OF THE INVENTION

The present invention relates to data communications, and more particularly, to methods and arrangements for transmitting data for over wires connected between devices located near one another, for example, within a multiple structure campus environment or a single structure business or home environment.

BACKGROUND OF THE INVENTION

In the future, it is expected that homes will have several computing devices and other data-dependent appliances that will need to be interconnected or networked together. These "computing resources" will be configured to exchange information with one another in the form of data that is transmitted over one or more communications resources within the home environment. To allow for such networking within the home environment, cost effective communication resources need to be developed.

Baseband Ethernet technology is currently being employed in many business environments to provide similar networking capabilities between current computing resources. For example, a baseband Ethernet technology known as 10 BASE-T Ethernet is becoming common because it provides a fairly high data rate and utilizes twisted pair wires, similar to those used for telephones, rather than coaxial cables to interconnect the computing resources.

The electrical and operational configuration of a 10 BASE-T network is specified by the Institute for Electrical and Electronic Engineers (IEEE) 802.3 standard. A 10 BASE-T network provides a 10 megabit per second (Mbps) data channel between computing resources. In accordance with the IEEE 802.3 standard, a Carrier Sense, Multiple Access with Collision Detection (CSMA/CD) protocol is employed to allow the computing resources to utilize the shared communications resource, in this case two twisted pair wires (i.e., one twisted pair for transmitting and one twisted pair for receiving).

A 10 BASE-T network employs conventional baseband transmission techniques, and as such does not require a carrier signal or additional modulation. The data in the 10 Mbps channel is, however, Manchester encoded prior to transmission through the twisted pair wire to embed timing information within the transmitted data signal. Thus, each of the computing resources typically includes a network interface circuit or card (NIC) that provides the necessary Manchester encoding and decoding capability.

As a result of the Manchester encoding, however, the actual data transmission rate associated with the 10 Mbps channel is essentially doubled to 20 Mbps. Therefore, it is necessary that the communication media or resource (e.g., twisted pair wire) be capable of providing at least 20 Mbps bandwidth to effectively carry the Manchester encoded data. The traditional twisted pair wiring that is installed in most homes for use with the telephone is not shielded and/or designed to carry 20 Mbps of digital data, and as such typically cannot provide this needed bandwidth. Thus, bringing 10 BASE-T networking to a home environment usually requires an investment in new, higher-bandwidth rated, twisted pair wiring (e.g., shielded). For many homeowners this cost will be prohibitive. Additionally, many homes have only one twisted pair wire installed, rather than the required two twisted pair wires.

Some other proposed solutions for home networking include standard modem technology and digital subscriber line (XDSL) technology. These technologies are directed towards providing external connectivity through existing telephone and related data communication services, as well as potentially providing limited internal home networking. One of the problems associated with standard modem technology, however, is that it is currently limited to data speeds of about 56 kbps and often requires very complicated circuitry. Although, xDSL technology can transmit data at a much higher rate than standard modem technology, for example, up to about 4 Mbps, the cost of implementing such is very high and typically requires very complicated modulation methods.

There are technologies and products that are directed more towards home networking. For example, Tut Systems Inc., of Pleasant Hill, Calif., produces a HR1300T communication device. The HR1300T uses a "time modulation line code" to provide an in-home network over existing phone lines. However, this modulation scheme currently only provides about a 1 to 2 Mbps data rate.

Therefore, as can be appreciated, there is a need to provide improved methods and arrangements that allow standard home wiring, or other inexpensive or existing communication media, to be used as a communication resource between computing resources. Preferably, the methods and arrangements not only provide the necessary bandwidth, but are also cost effective, essentially transparent to the user/computing resource, and simple to implement.

SUMMARY OF THE INVENTION

In accordance with certain aspects of the present invention, methods and arrangements are provided that allow computing resources that are located near to one another, for example, in a home environment or closely spaced multiple structure campus environment, to communicate over existing wires using radio frequency (RF) signals. In accordance with other aspects of the present invention, the methods and arrangements provide a cost effective networking capability that is, essentially transparent to the user/computing resource, and simple to implement within existing structures, for example, over wires that are about 1000 feet long.

By way of example, in accordance with certain aspects of the present invention, a standard Ethernet data signal, from a first device, is modulated using conventional RF modulation techniques and then transmitted for limited distances over existing telephone wiring to one or more other devices, which then demodulate the RF signal and recover the original Ethernet data signal. Thus, in this exemplary embodiment, the operating protocol of the Ethernet network (i.e., the CSMA/CD protocol) is allowed to operate seamlessly without knowledge of the additional communication processes.

In accordance with one embodiment of the present invention, an arrangement for transmitting digital data output by a first device to a second device over a twisted pair wire is provided. The arrangement includes a modulator and a line driver. The modulator is configured to receive a data signal that is output by the first device. The modulator modulates the data signal, using at least one radio frequency (RF) carrier, to produce a corresponding modulated data signal. For example, in certain embodiments the RF carrier has a frequency or center frequency of between about 1 MHz and about 280 MHz.

The modulated data signal is then provided to the line driver, which is configured to output the modulated data signal through at least one twisted pair wire to the second device, based on a carrier sense multiple access (CSMA) protocol.

In accordance with certain other embodiments of the present invention the modulator employs either a quadrature phase shift keying (QPSK), binary phase shift keying (BPSK), quadrature amplification modulation (QAM), or like technique. For example, in certain embodiments, the modulator employs differential QPSK techniques and the RF carrier preferably has a frequency between about 10 MHz and about 70 MHz. In other embodiments, the modulator employs differential BPSK techniques and the RF carrier preferably has a frequency between about 70 MHz and about 200 MHz. In still other embodiments, the modulator employs QAM techniques and the RF carrier preferably has a frequency between about 1 MHz and about 10 MHz.

In accordance with further embodiments of the present invention, the arrangement also includes a detector that is configured to receive the modulated data signal from the twisted pair wire and output a substantially reproduced modulated data signal to a demodulator that is configured to demodulate and otherwise substantially reproduce the data signal therefrom.

The above stated needs and others are also met by a method for transmitting data over twisted pair wire within a home environment, in accordance with certain embodiments of the present invention. The method includes outputting a digital signal from a first device, modulating the digital signal to produce a corresponding radio frequency (RF) signal, and transmitting the RF signal through at least one twisted pair wire to the second device using a carrier sense multiple access (CSMA) protocol.

In accordance with still another embodiment of the present invention, a method is provided for transferring data between a plurality of devices in a home environment, wherein the plurality of devices are interconnected by twisted pair wire that is also configured for telephone access. The method includes determining if the twisted pair wire is currently being used for transferring data by any of the plurality of devices, and provided that the twisted pair wire is not currently being used, then outputting a digital data stream from one of the plurality of devices, using the digital data stream to produce a corresponding RF signal using either QPSK, BPSK, QAM, or like techniques, and providing the RF signal through the twisted pair wire to at least one of the plurality of devices.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
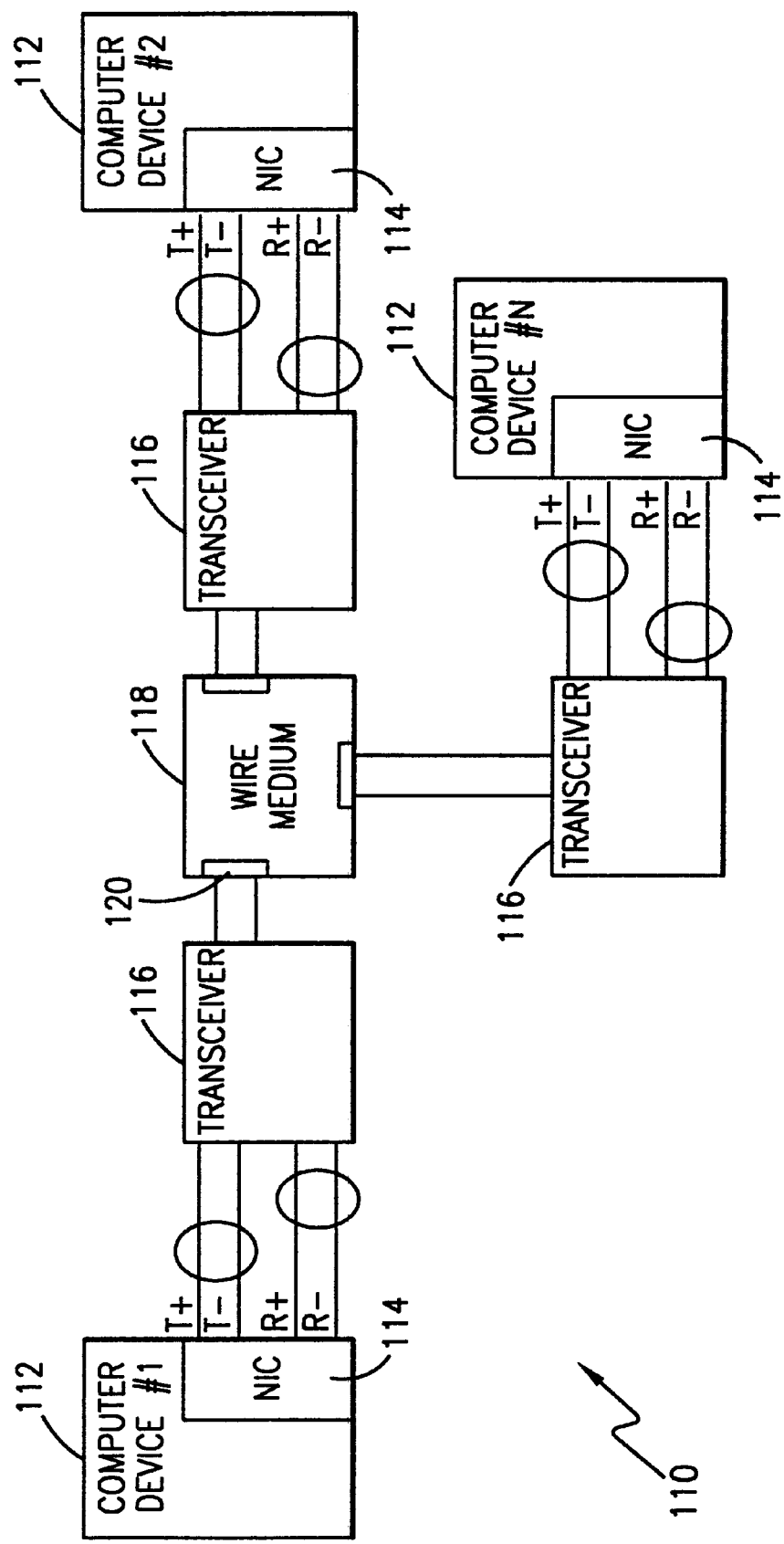
FIG. 1 is a block diagram depicting a home environment having a plurality of computing resources that are networked together through transceivers and a wire medium, in accordance with certain embodiments of the present invention.

FIG. 1 is a block diagram depicting an exemplary home environment 110 having several computing resources, such as devices 112 (numbered 1 through N), that are networked together through transceivers 116 and a wire medium 118, in accordance with certain embodiments of the present invention.

Each device 112 is configured to exchange data (i.e., send and/or receive data) with one or more other devices 112. By way of example, devices 112 can include computers, servers, and related peripheral devices such as storage devices, external communication devices, output devices, printing devices, and the like. Devices 112 are not limited to traditional computing devices and can also include other appliances that are capable of exchanging data, including control/status data, with one or more other devices.

As shown in FIG. 1, devices 112 include a network interface circuit or card (NIC) 114 that allows devices 112 to be networked through a defined communication medium (not shown). For example, NIC 114 can be a standard 10 BASE-T NIC that provides data communication over two, typically shielded, twisted-pair wires. The first twisted pair wire, with wires labeled T+ and T−, is used for transmitting "outgoing" differential data signals. The second twisted pair wire, with wires labeled R+ and R−, is used for receiving "incoming" differential data signals. A 10 BASE-T Ethernet network provides up to about 10 Mbps of data communication between devices 112. Because the IEEE 802.3 standard requires that the incoming and outgoing data be Manchester encoded, however, the actual data rate over the twisted pair wires of a 10 BASE-T network is doubles and can, therefore, be as high as about 20 Mbps.

Rather than require additional and/or a higher bandwidth wire medium, in accordance with certain embodiments of the present invention, a transceiver 116 is arranged between NIC 114 to provide an essentially seamless interface that advantageously allows for the transmission of data over wire medium 118, for limited distances, using RF modulation techniques.

During a data transmission, transceiver 116 modulates the outgoing data signal from NIC 114 using at least one RF carrier signal, and subsequently re-transmits the outgoing RF modulated signal over wire medium 118 to one or more other transceivers 116.

As depicted in FIG. 1, transceiver 116 is connected to wire medium 118 through a conventional telephone connection 120 (e.g., an RJ45 connector).

Upon receiving an incoming RF modulated signal, transceiver 116 essentially regenerates the original outgoing data signal by demodulating the incoming RF modulated signal and then re-transmitting, albeit typically over a shorter distance, the resulting incoming data signal to an associated NIC 114.

In this manner, devices 112 are allowed to exchange data seemingly in accordance with a prescribed standard, such as 10 BASE-T Ethernet, over a wire medium 118 that typically would not provide the necessary bandwidth and/or requisite number of conductors for such data communications.

Wire medium 118 can include any common home wiring, such as, for example, twisted pair wires. Since many home environments 110 already have at least one twisted pair wire available for telephone use, in accordance with certain exemplary embodiments of the present invention, wire medium 118 includes a single twisted pair wire. In accordance with other embodiments of the present invention, wire medium 118 can include other wiring and/or cabling of the type typically found in home environment 110.

A more detailed description of an exemplary transceiver 116 is given herein below with reference to FIG. 2.

In accordance with certain aspects of the present invention, it is preferred that transceiver 116 operate seamlessly with respect to each device 112, and in particular with respect to NIC 114. In other words, the data communication between devices 112 appears to each device and corresponding NIC 114 to be fully 10 BASE-T Ethernet compliant as would be a conventional 10 BASE-T Ethernet local area network (LAN).

Figure 2:
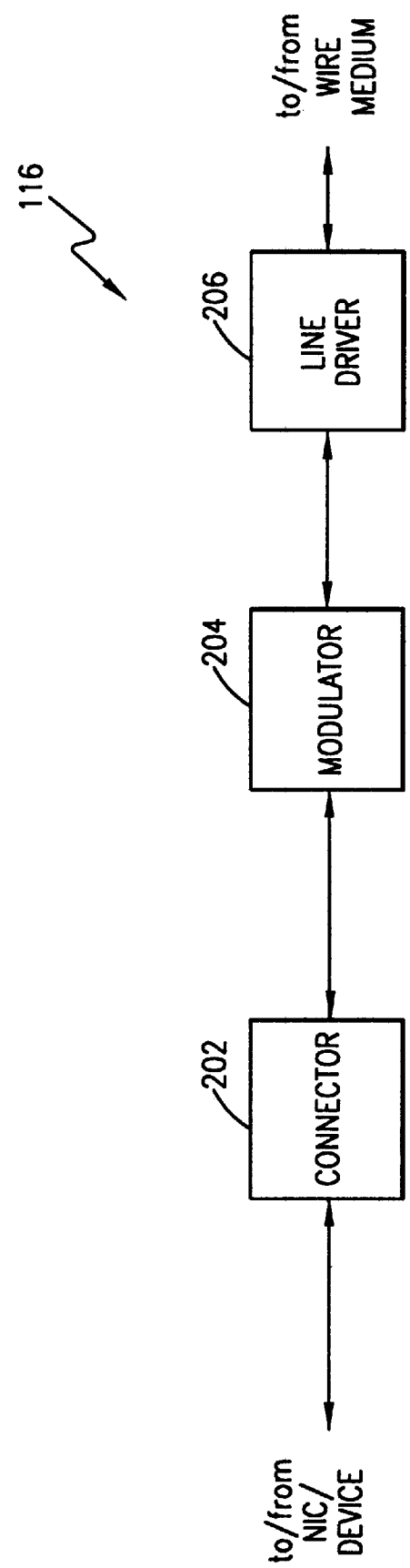
FIG. 2 depicts a block diagram of a transceiver, for example, as employed in the exemplary home environment of FIG. 1, having a modulator and a line driver, in accordance with certain embodiments of the present invention.

As shown in the block diagram of FIG. 2, transceiver 116 includes a connector 202, a modulator 204 and a line driver 206.

Connector 202, which is optional, provides a quick connect/modular interface to NIC 116 through conventional twisted pair wire/telephone connectors and jacks. Connector 202 essentially passes electrical signals between NIC 114 and modulator 204 without intentionally altering the electrical signals.

Modulator 204 is configured to receive outgoing data from NIC 114. For a 10 BASE-T NIC, the outgoing data has been Manchester encoded and transmitted by NIC 114 over twisted pair wire (e.g., see T+ and T− in FIG. 1).

Within modulator 204, the outgoing data is at least modulated using conventional modulation techniques and at least one RF carrier. For example, modulator 204 can employ phase modulation, frequency modulation, and/or amplitude modulation techniques. The RF carrier has a center frequency within the RF portion of the electromagnetic spectrum, and more preferably has a center frequency between about 1 MHz and about 280 MHz.

Those skilled art will recognize that certain RF frequencies may be better suited for particular applications/installations. For example, it would be prudent to select an RF frequency that is neither interfered with by other devices, and/or interferes with other devices. By way of further example, cordless telephones typically operate with a frequency of about 49 MHz; thus, the frequency band near 49 MHz (e.g., 45–55 MHz) might be avoided. Furthermore, lower RF frequencies may be preferred in an effort to reduce electronic component costs, which tend to increase for circuits that operate at higher frequencies.

In accordance with certain other embodiments of the present invention, modulator 204 can also be configured to encode/decode the outgoing data signal using conventional encoding/decoding techniques. By way of example, if the encoded data includes Manchester encoded data, then a Manchester decoding scheme can be employed within modulator 204 to regenerate the original data signal as provided by device 112 to NIC 114. This may be preferred in certain home environments, because the decoded data signal will have a data rate that is essentially about 50% of the data rate associated with the Manchester encoded data signal. This reduced data rate can allow for the use of a wire medium 118 having reduced bandwidth capabilities, such as, for example, an unshielded, twisted pair wire. Additional features of the modulator as applied to a particular exemplary application are described in greater detail below, with regard to FIG. 3.

Referring to again to FIG. 2, however, the outgoing RF signal from modulator 204 is provided to line driver 206. Line driver 206 is configured to output the RF signal to wire medium 118. Preferably, the RF signal is significantly free of noise and has sufficient power to be received by at least one other transceiver 118. Those skilled in the art will recognize that the amount of power required varies depending upon the application, selected components, wire parameters (e.g., impedance, attenuation, SNR, etc), encoding/modulation techniques, etc.

Before discussing the further exemplary embodiment of FIG. 3, below, it is also important to recognize that transceiver 116 in FIG. 2, as its name implies, is also configured to receive incoming data from other transceivers 116 through wire medium 118. Thus, referring to FIG. 2 once again, line driver 206 is also configured to detect and receive an incoming RF modulated signal. Once detected, filtered and/or amplified within line driver 206, the incoming RF modulated signal is provided to modulator 204, which then demodulates the incoming RF signal and eventually regenerates the original data signal as output by the sending NIC 114. This regenerated incoming data signal is then provided by modulator 204 over twisted pair wire (e.g., see R+, R− in FIG. 1) to NIC 114, for example, through connector 202.

Figure 3:
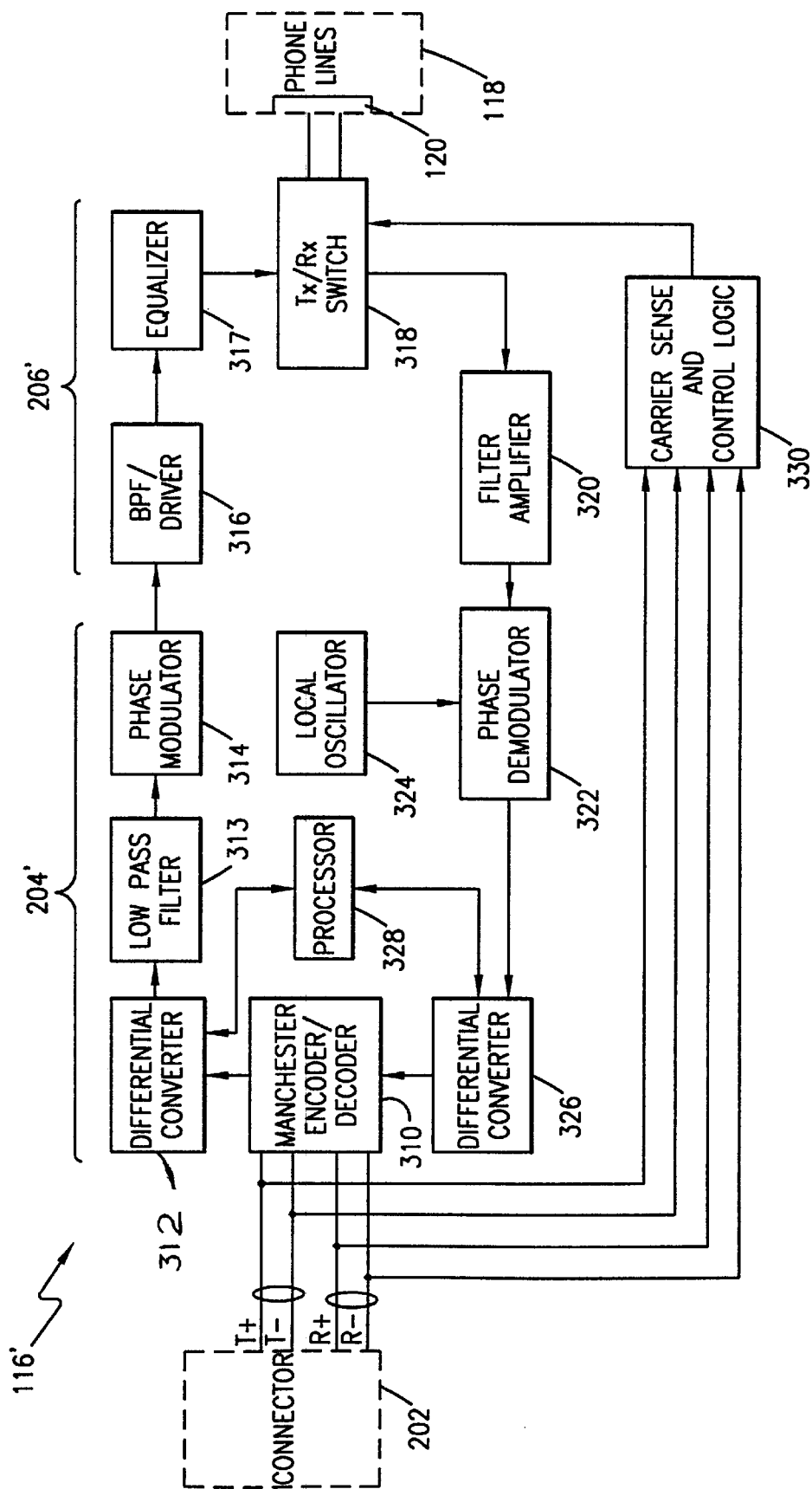
FIG. 3 depicts a block diagram of a transceiver, for example, as employed in the exemplary home environment of FIG. 1, wherein the wire medium includes at least one twisted pair wire and the transceiver includes a modulator/demodulator and a line driver, in accordance with certain preferred embodiments of the present invention.

By way of further example, a transceiver 116', in accordance with certain preferred embodiments of the present invention, is depicted in the block diagram of FIG. 3.

Transceiver 116' includes a connector 202, modulator 204', and a line driver 206'. Modulator 204' includes a Manchester encoder/decoder 310, a differential converter 312, a low pass filter 313, a phase modulator 314, a phase demodulator 322, a local oscillator 324, a differential converter 326, and a control processor 328. Line driver 206' includes a bandpass filter/driver 316, an equalizer 317 (optional), a transmit/receive switch 318, a filter/amplifier 320, and carrier sense/control logic 330.

As shown, transceiver 116' is configured to be operatively coupled between NIC 114 and a phone jack 120 of wire medium 118, which in this exemplary embodiment includes a single twisted pair wire. In this example, it is preferred that NIC 114 be a conventional 10 BASE-T NIC.

The operation of transceiver 116' will now be described. Transceiver 116' is selectively operable in two modes, a transmit mode (for outgoing data) and a receive mode (for incoming data). Because Ethernet employs CSMA/CD protocols, the default mode of transceiver 116' is the receive mode. If outgoing encoded data is to be transmitted by NIC 114 to transceiver 116', then transceiver 116' will switch to transmit mode provided that no other data signals are sensed on the twisted pair wire. This can be accomplished for example by carrier sensor and control logic 330. If no other data signals are sensed on the twisted pair wire, then carrier sensor and control logic 330 switches transmit/receive switch 318 into a transmit position.

As mentioned above, a 10 BASE-T NIC 114 requires two twisted pair wires. The first twisted pair wire, having conductors T+ and T−, is used for transmitting outgoing encoded data. The second twisted pair wire, having conductors R+ and R−, is used for receiving incoming encoded data. The outgoing encoded data has been encoded by NIC 114 using a Manchester line code. Therefore, the outgoing encoded data received from NIC 114 over twisted pair wire T+ and T− is received by encoder/decoder 204 in the form of two differential data signals. Encoder/decoder 204 decodes the outgoing encoded data and provides corresponding outgoing decoded data to differential convertor 312.

The outgoing decoded data received from encoder/decoder 204 is then differentially converted by differential convertor 312, i.e., the differential signal pair associated with the outgoing decoded data are converted into a single outgoing decoded data signal.

The single outgoing decoded data signal is then provided to low pass filter 313. In accordance with certain preferred embodiments of the present invention, low pass filter 313 is a Butterworth (e.g., fifth-order) low pass filter, Gaussian filter, or the like, having a pass band equal to about 88 percent of the data rate of the outgoing decoded data signal.

Once filtered, the outgoing decoded data signal is then provided to phase modulator 314. Phase modulator 314 modulates the signal to a radio frequency (RF) signal using a RF carrier and a phase modulation scheme, such as, for example, differential binary phase shift keying (DBPSK), or differential quadrature phase shift keying (DQPSK).

While it is believed that reasonable results are achievable using QPSK techniques when the RF carrier has a center frequency between about 1 MHz and about 280 MHz, it is preferred that the RF carrier have a center frequency between about 10 MHz and about 70 MHz, and most preferably a center frequency between about 25.6 and about 34.4 MHz.

Similarly, while it is believed that reasonable results are achievable using BPSK techniques when the RF carrier has a center frequency between about 1 MHz and about 280 MHz, it is preferred that the RF carrier have a center frequency between about 70 MHz and about 200 MHz.

These modulation schemes and higher carrier signal frequencies allow the data to be communicated over the twisted pair wire for limited distances, preferably within home environment 110, without being interfered with or interfering with other plain old telephone system (POTS) and/or xDSL signals that may be transmitted, simultaneously, over the twisted pair wire.

Although the transceiver 116' employs phase modulation, other types of modulation schemes/techniques can be employed, such as, for example, a multi carrier modulation (MCM) and/or quadrature amplitude modulation (QAM). While it is believed that reasonable results are achievable using MCM and/or QAM techniques when the RF carrier has a center frequency between about 1 MHz and about 280 MHz, it is preferred that the RF carrier have a center frequency between about 1 MHz and about 10 MHz for QAM. Further, when QAM is employed, it is also preferred that a dynamic equalizer 317 be included in line driver 206'. Equalizer 317 is configured to dynamically equalize the outgoing RF modulated signal based on one or more determined characteristics associated with wire medium 118 and other circuitry connected thereto.

It is recognized that the modulating processes and line driver processes employed within modulator 204' and line driver 206', respectively, can be embodied in circuitry/processors in analog, digital, software, or any combination thereof.

Referring again to FIG. 3, the outgoing RF modulated signal is provided to bandpass filter/driver 316, which essentially limits the bandwidth of the signal. The outgoing modulated signal is also amplified within bandpass filter/driver 316.

Next, the outgoing RF modulated signal is then passed through switch 318 and eventually applied to the twisted pair wire within wire medium 118.

When the carrier sense and control logic 330 determines that NIC 114 has completed transmitting the outgoing data, switch 318 will be placed back into the receive mode.

When operating in the receive mode, the incoming RF modulated signal from the twisted pair wire of medium 118 is received through switch 318 and then bandpass filtered and amplified by filter/amplifier 320. The resulting incoming RF modulated signal is then demodulated by phase demodulator 322 using a corresponding phase demodulation scheme and a reference timing signal from local oscillator 324. The resulting incoming demodulated/decoded data signal is then differentially converted with differential transceiver 326 from a single signal to a differential signal pair. The differential signal pair is then re-encoded using encoder/decoder 310 to regenerate the incoming encoded data as originally sent by the sending NIC 114 (e.g., see FIG. 1). This incoming encoded data is then provided to NIC 114 over twisted pair wire R+ and R−, through connector 202.

As described hereinabove, carrier sense and control logic 330 is used to change switch 318 between transmit and receive positions. The signals received from NIC 114 are used to determine if NIC 114 wants to transmit data. When it is determined that NIC 114 wants to transmit data, carrier sense and control logic 330 determines if wire medium 118 is available (i.e., that no other transceivers 116 are transmitting data). This task is accomplished by employing a conventional CSMA/CD protocol scheme.

Processor 328 controls at least three functions, the differential decoding and encoding performed by differential converters 312 and 326 as well as clock recovery using the reference signal output by local oscillator 324.

Those skilled in the art will recognize that the teachings of the present invention, as described through the exemplary embodiments above, provides methods and arrangements that enables a potentially higher data rate signal to be transmitted over a wire medium using RF modulation techniques, without losing data, introducing significant latencies, and/or interfering with other contemporary uses of the twisted pair wire in home environment 110.

Although certain embodiments in accordance with the present invention, are depicted in the accompanying Drawings and described in the foregoing text, it should be understood that the invention is not limited to the embodiments disclosed, but is capable of numerous rearrangements, modifications and substitutions without departing from the spirit of the invention as set forth and defined by the following claims.

What is claimed is:

1. An arrangement for transmitting digital data output by a first device to a second device over a twisted pair wire, the arrangement comprising:

a modulator configured to receive a data signal output by the first device and modulate the data signal to produce a corresponding modulated data signal using at least one radio frequency (RF) carrier; and a line driver configured to receive the modulated data signal and output the modulated data signal through at least one twisted pair wire to the second device based on a carrier sense multiple access (CSMA) protocol, wherein the modulator further includes a first filter that is configured to low pass filter the data signal, and wherein the first filter is a low pass filter having a pass band equal to about 88 percent of a data rate of the digital signal and is selected from a group of low pass filters consisting of a fifth-order Butterworth low pass filter and a Gaussian low pass filter.

2. The arrangement as recited in claim 1, wherein the line driver further includes a second filter that is configured to bandpass filter the modulated data signal.

3. An arrangement for transmitting digital data output by a first device to a second device over a twisted pair wire, the arrangement comprising:

a modulator configured to receive a data signal output by the first device and modulate the data signal to produce a corresponding quadrature amplitude modulated (QAM) data signal using at least one radio frequency (RF) carrier; and a line driver configured to receive the modulated data signal and output the modulated data signal through at least one twisted pair wire to the second device based on a carrier sense multiple access (CSMA) protocol, wherein the line driver includes an equalizer that is configured to dynamically equalize the modulated data signal to account for at least one determined characteristic associated with at least a portion of the twisted pair wire.

4. The arrangement as recited in claim 3, further comprising:

a detector configured to receive the modulated data signal from the twisted pair wire and output a substantially reproduced modulated data signal;

a demodulator configured to receive the reproduced modulated data signal, and substantially reproduce the data signal therefrom, and output a reproduced data signal to the second device.

5. A method for transmitting data over twisted pair wire within a home environment, the method comprising:

outputting a digital signal from a first device, the digital signal comprising data that is to be provided to a second device;

modulating the digital signal with a carrier signal having a carrier frequency to produce a corresponding radio frequency (RF) signal; and transmitting the RF signal through at least one twisted pair wire to the second device using a carrier sense multiple access (CSMA) protocol, wherein the carrier frequency is between about 10 MHz and about 70 MHz, and the step of modulating the digital signal comprises modulating the digital signal using a technique selected from a group consisting of quadrature phase shift keying (QPSK) and differential quadrature phase shift keying (DQPSK).

6. A method for transmitting data over twisted pair wire within a home environment, the method comprising:

outputting a digital signal from a first device, the digital signal comprising data that is to be provided to a second device;

modulating the digital signal with a carrier signal having a carrier frequency to produce a corresponding radio frequency (RF) signal; and transmitting the RF signal through at least one twisted pair wire to the second device using a carrier sense multiple access (CSMA) protocol, wherein the carrier frequency is between about 70 MHz and about 200 MHz, and the step of modulating the digital signal comprises modulating the digital signal using a technique selected from a group consisting of binary phase shift keying (BPSK) and differential binary phase shift keying (BPSK).

7. A method for transmitting data over twisted pair wire within a home environment, the method comprising:

outputting a digital signal from a first device, the digital signal comprising data that is to be provided to a second device;

modulating the digital signal to produce a corresponding radio frequency (RF) signal; and transmitting the RF signal through at least one twisted pair wire to the second device using a carrier sense multiple access (CSMA) protocol, wherein the step of modulating the digital signal further comprises modulating the digital signal using a carrier signal having a carrier frequency between about 1 MHz and about 10 MHz, wherein the step of modulating the digital signal further comprises quadrature amplitude modulating (QAM) the digital signal, and wherein the step of transmitting the RF signal further comprises dynamically equalizing the RF signal to account for at least one determined characteristic associated with at least a portion of the twisted pair wire.

8. The method as recited in claim 7, further comprising:

substantially reproducing the RF signal as transmitted through the twisted pair wire;

demodulating the RF signal to substantially reproduce the digital signal; and supplying the digital signal to the second device.

9. An arrangement for transmitting digital data output by a first device to a second device over a twisted pair wire, the arrangement comprising:

a modulator configured to receive a data signal output by the first device and to modulate the data signal to produce a corresponding quadrature phase shift keyed (QPSK) or differential QPSK modulated data signal using at least one radio frequency (RF) carrier having a frequency between about 10 MHz and about 70 MHz; and a line driver configured to receive the modulated data signal and output the modulated data signal through at least one twisted pair wire to the second device based on a carrier sense multiple access (CSMA) protocol.

10. An arrangement for transmitting digital data output by a first device to a second device over a twisted pair wire, the arrangement comprising:

a modulator configured to receive a data signal output by the first device and to modulate the data signal to produce a corresponding binary phase shift keyed (BPSK) or differential BPSK modulated data signal using at least one radio frequency (RF) carrier having a frequency between about 70 MHz and about 200 MHz; and a line driver configured to receive the modulated data signal and output the modulated data signal through at least one twisted pair wire to the second device based on a carrier sense multiple access (CSMA) protocol.

\* \* \* \* \*